United States Patent [19]
Nakano et al.

[11] Patent Number: 5,363,418
[45] Date of Patent: Nov. 8, 1994

[54] DATA TRANSMITTER AND RECEIVER AND THE DATA CONTROL METHOD THEREOF

[75] Inventors: Masatoshi Nakano, Hirakata; Akio Kurobe, Moriguchi, both of Japan

[73] Assignee: Matsushita Electric Industrial Co., Ltd., Osaka, Japan

[21] Appl. No.: 900,913

[22] Filed: Jun. 18, 1992

[30] Foreign Application Priority Data

Jun. 21, 1991 [JP] Japan ................... 3-150376

[51] Int. Cl.$^5$ .................. H04L 25/38; H04L 5/24
[52] U.S. Cl. ..................... 375/117; 370/48
[58] Field of Search ............. 375/107, 112, 117; 370/48, 99, 100.1, 110.1, 112

[56] References Cited
U.S. PATENT DOCUMENTS

| | | | |
|---|---|---|---|
| 4,310,922 | 1/1982 | Lichtenberger et al. | 370/84 |
| 4,617,658 | 10/1986 | Walters | 370/84 |
| 4,635,248 | 1/1987 | Yoshida . | |
| 4,797,883 | 1/1989 | Krans | 370/109 |
| 4,987,570 | 1/1991 | Almond et al. | 370/84 |
| 5,142,556 | 8/1992 | Ito | 375/106 |

*Primary Examiner*—Stephen Chin
*Assistant Examiner*—Diane Kobayashi
*Attorney, Agent, or Firm*—Price, Gess & Ubell

[57] ABSTRACT

This invention provides a start-stop synchronous data transmitter and a start-stop synchronous data receiver for transmitting a code consisting of a start bit, data, and a stop bit, wherein the data in a 1-bit interval is divided into a number of slots, to each of which different data are set so as to multiplex the data as many data as the number of the slots.

17 Claims, 19 Drawing Sheets

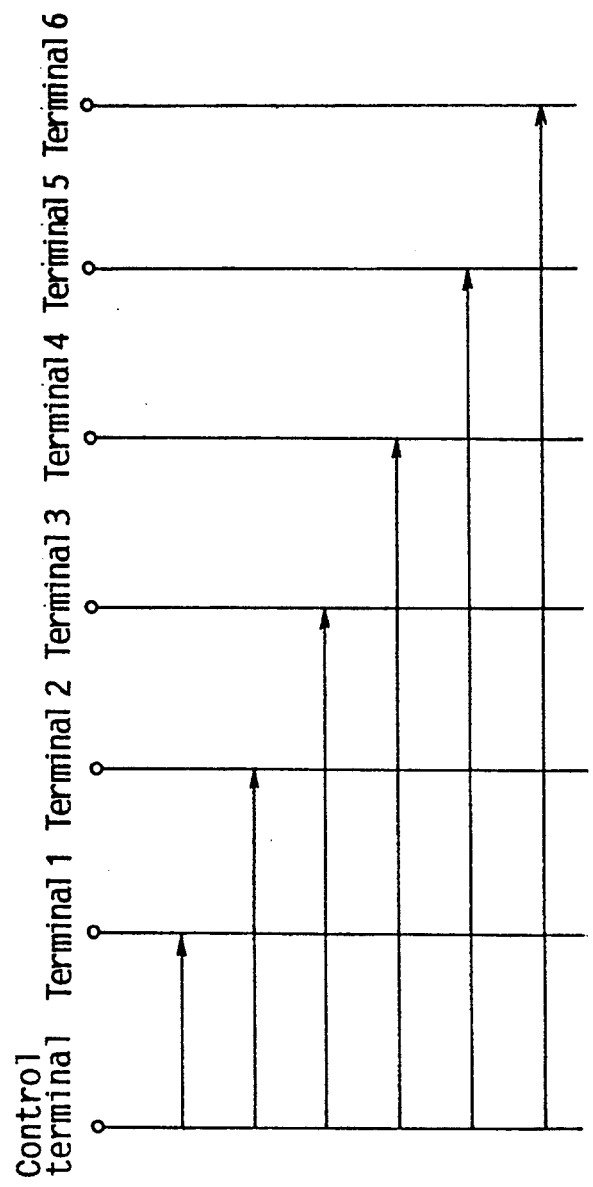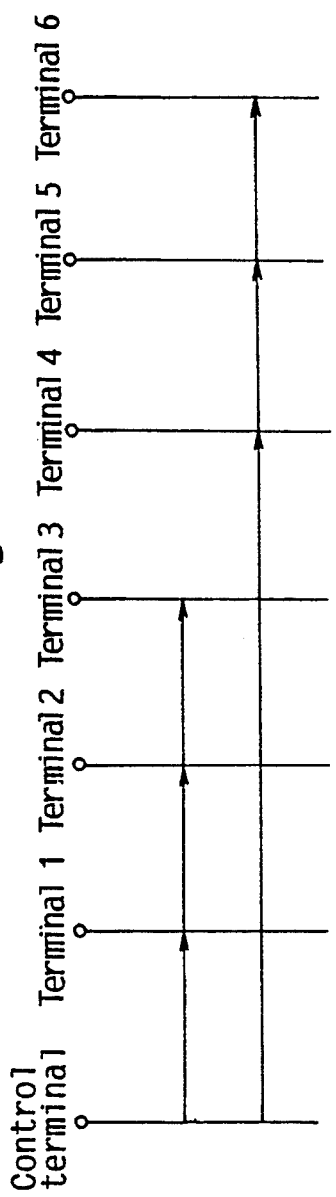

DATA TRANSMITTER AND RECEIVER AND THE DATA CONTROL METHOD THEREOF

BACKGROUND OF THE INVENTION (1) Field of the Invention

The present invention relates to construction of a start-stop synchronous data transmitter and a receiver incorporated therein, and to methods of contention detection, and terminal allocation in a network using these components.

(2) Description of the Related Art

With a conventional start-stop synchronous data transmission system, a 1-bit of digital data is logically fixed to either 1 or 0 based on a transmission speed, and the transmission speed and/or transmission media are increased in order to enhance transmission volume. Although increasing the transmission speed enables the system to improve transmission efficiency per medium, it also requires a high-speed transmitter and receiver, which leads to hardware enlargement as well as cost increase.

A conventional receiver used in the system as shown in FIG. 1 comprises a start bit detector 11, a sample cycle counter 12, a sample point decoder 13, and a latch 14.

Upon receiving serial data, the start bit detector 11 detects a falling edge of a start bit thereof, and the sample cycle counter 12 counts a sample cycle for 1-bit, in turn, the sample point decoder 13 outputs a sample clock signal when it counts a given counting value to the latch 14 which samples the serial data with the sample clock signal.

FIG. 2(A) is a timing chart of the signals in the receiver and an enlarged timing chart for a 1-bit interval is shown in FIG. 2(B). Upon detecting the falling edge of the start bit of serial data RXD (hereinafter, referred to as the RXD), the start bit detector 11 outputs a signal STD (hereinafter, referred to as the STD) to the sample cycle counter 12, whereby it starts to count a clock pulse one after another and outputs the counting value to the sample point decoder 13. In turn, the sample point decoder 13 outputs a sample clock signal SCLK (hereinafter, referred to as the SCLK) for the first time to the latch 14 after a lapse of a given time from the output of the STD, and thereafter, continues supplying the SCLK in every bit cycle to the latch 14. As a result, the latch 14 outputs serial data RXDS (hereinafter, referred to as the RXDS) by sampling the RXD when detecting a rising edge of the SCLK.

Included in a conventional transmission method in the system as shown in FIG. 3 is a control terminal 31, terminals 32–34, all of which are connected to a transmission line. The control terminal 31 controls the terminals 32–34 by transmitting a control command. For instance, it transmits each command to the respective terminals through separate communication or it transmits a command to some of the terminals through broadcast communication. As shown in FIG. 4(A), the control terminal 31 assigns terminals 1–6 to power on, turn up the volume, activate a sensor, set a timer, turn on a fan, and turn on an air-conditioner, respectively through the separate communication or as shown in FIG. 4(B), it assigns the terminals 1–3 and 4–6 to power on and turn up the volume, respectively through the broadcast communication.

Such a method is applied to a pattern control which enables a control terminal to transmit short data to other terminals equipped with a buffer memory with a small capacity.

Although the broadcast communication facilitates the ability to transmit a command simultaneously to the terminals belonging to a group address, it transmits each command to the corresponding terminal as well, therefore reducing the advantage thereof. In addition, the control of the terminals under the command is delayed when the transmission line is not available due to contention.

SUMMARY OF THE INVENTION

The present invention has an object to provide a transmitter suitable for multiplex data transmission so that transmission efficiency is enhanced.

The present invention has another object to provide a receiver suitable for multiplex data transmission so as to enhance transmission efficiency.

The present invention has yet another object to provide a transmission control method suitable to a transmission system comprising the above transmitters and receivers, and terminals.

The first object is fulfilled by a start-stop synchronous data transmitter transmitting a code including a start bit, data, and a stop bit, the transmitter comprising an oscillator for outputting a high speed shift clock signal, a parallel-serial converting device for converting parallel signals into serial signals synchronously with the high speed shift clock signal and having (n) load signal lines and as many latch elements as a number obtained by multiplying the number of bits consisting of the code and (n) together, where (n) is an integer, and each load signal lines is connected to a load terminal of the latch elements by skipping (n−1) load terminals, and a writing device for inputting the data and for activating the load signal lines one by one in order to write the data in one latch elements displaced in every (n) latch elements.

The parallel-serial converting device may include a shift register for transmitting multiplex data having as many steps as a number obtained by multiplying the number of bits consisting of the code and (n) together, each of which has an input terminal and a load signal terminal for parallel data, and (n) load signal lines which are connected to the load signal terminal in every (n−1) lines.

The parallel-serial converting device may include a transmission buffer having as many bits as a number obtained by multiplying the number of bits consisting of the code and (n) together, an input terminal to each bit, and (n) load signal lines which are connected to load terminals of the latch elements in every (n−1) lines, and a shift register for transmitting multiplex data having as many steps as the number of the bits of the transmission buffer to latch the parallel data therefrom.

Each step of the shift register for transmitting multiplex data may include a first selector, a second selector, and a flip-flop, and the first selector selectively outputs the data inputted from the flip-flop in a low order bit at data shifting, and the data inputted from the writing device at data loading to an input terminal of the flip-flop, the second selector selectively outputs a shift clock signal at the data shifting and a load signal at the data loading to a clock input terminal of the flip-flop, and the flip-flop latches the data inputted to the input terminal thereof in accordance with the signal inputted to the clock input terminal thereof and subsequently outputs the latched data.

The writing device may have as many demultiplexers as the number of bits consisting the data, each having a 1-input terminal and a n-output terminal, and n-outputs of each demultiplexer are connected to the data input terminals of the (n) latch elements in the parallel-serial converting device.

The writing device may not be connected to latch elements excluding the first (n) and last (n) latch elements so that signals with given logical levels are inputted thereto, respectively.

At least one control signal may be sent to each demultiplexer so as to connect each input terminal and one of the n-output one by one and synchronously in all the demultiplexers.

The transmitter may further comprise a shift register for transmitting non-multiplex data having as many steps as the number of bits of a code including a start bit, data, and a stop bit, a frequency divider for outputting a frequency divider clock obtained by dividing a frequency of the shift clock signal from the oscillator by (n) to the shift register in order to transmit the non-multiplex data, and a selector for selectively outputting one of the serial data from the shift register for transmitting the multiplex data and those from the shift register for transmitting the non-multiplex data.

Such a transmitter is able to transmit the multiplex data by multiplexing the (n) data in the 1-bit interval, in other words, the transmitter makes it possible to transmit multiple data simultaneously to a number of receivers.

The second object is fulfilled by a start-stop synchronous data receiver for receiving serial data multiplexed with (n) data by dividing a 1-bit interval of data excluding a start bit and a stop bit of a code into (n) slots so as to set each of the (n) data to the respective slots, where (n) is an integer, the receiver comprising a start bit detecting device for detecting a first level change of the serial data and outputting a start bit detection signal, a sampling clock signal generating device for generating at least one sampling clock signal to sample the serial data at the timing of an assigned slot upon receiving the start bit detection signal, and a slot data sampling device for sampling the data belonging to the assigned slot in the serial data using the sampling clock signal.

The sampling clock signal generating device may include an oscillator for outputting a frequency clock signal with a frequency obtained by multiplying the number of slots of (n) and an integer of (m) together, a counting device for counting a given value in every bit interval until the stop bit is transmitted with the frequency clock signal upon receiving the start bit detection signal, and a counting value detecting device for detecting a given counting value for each slot and outputting a counting value detection signal as a sampling clock signal.

The given value for the counting device may be (n)×(m), and the given value for the counting value detecting device may be a number within a range of (L−1)×m+1 from (L)×(m), where (L) is a number representing a place given to the slot.

The sampling clock signal generating device may include at least another counting value detecting device for detecting a given counting value for each slot and outputs a counting value detection signal as a sampling clock signal, the receiver may further comprise at least one selector for selecting one of the counting value detecting signals from a number of the counting value detecting devices, and each counting value detecting device may detect the respective counting value to each slot.

The slot data sampling device may include latch circuits for latching the serial data at the timing of the sampling clock signal, and a serial-parallel converting device for inputting and shifting the data from the latch circuits at the timing of the sampling clock signal.

The slot data sampling device may include a serial-parallel converting device for inputting and shifting the serial data at the timing of the sampling clock signal.

The receiver may include first and second slot data sampling devices and the second sampling device samples and selects the data set in a slot other than the one selected by the first slot data sampling device using another sampling clock signal which is outputted from the sampling clock signal generating device.

Constructing the receiver as above enables the receiver to receive at least one arbitrarily selected data set in one of the slots within the multiplex data.

The third object is fulfilled by a method for allocating slots obtained by dividing data per bit excluding a start bit and a stop bit of a code to a main terminal and sub-terminals in accordance with a communication sequence, the method comprising the steps of transmitting a slot service command from the main terminal to each sub-terminal in the network to ask capability of receiving multiplexed data transmission thereof, transmitting a slot request command from each sub-terminal to the main terminal to request a desirable slot upon receiving the slot service command, and transmitting a slot response command from the main terminal to each sub-terminal to set a slot thereto by processing a slot discrimination using the slot request command. And a method of detecting contention prior to the transmission in a network where a number of terminals are connected to a transmission line, the method comprising the steps of transmitting non-multiplex data in every bit to all the terminals while receiving the non-multiplex data in every bit in order to compare the transmitted and received data in every bit and continuing the transmission when the transmitted and received data match and stopping the transmission when the transmitted and received data do not match.

With such methods, the slots can be allocated to the terminals prior to the multiplex data transmission. Moreover, these methods enable the terminal to transmit the multiplex data while controlling the contention among the terminals.

BRIEF DESCRIPTION OF THE DRAWING

These and other objects, advantages and features of the invention will become apparent from the following description thereof taken in conjunction with the accompanying drawings which illustrate specific embodiments of the invention. In the drawings:

FIGS. 4a and 4b show a terminal control sequence of the system in FIG. 3;

DESCRIPTION OF THE PREFERRED EMBODIMENTS

(EMBODIMENT I)

Figure 1:
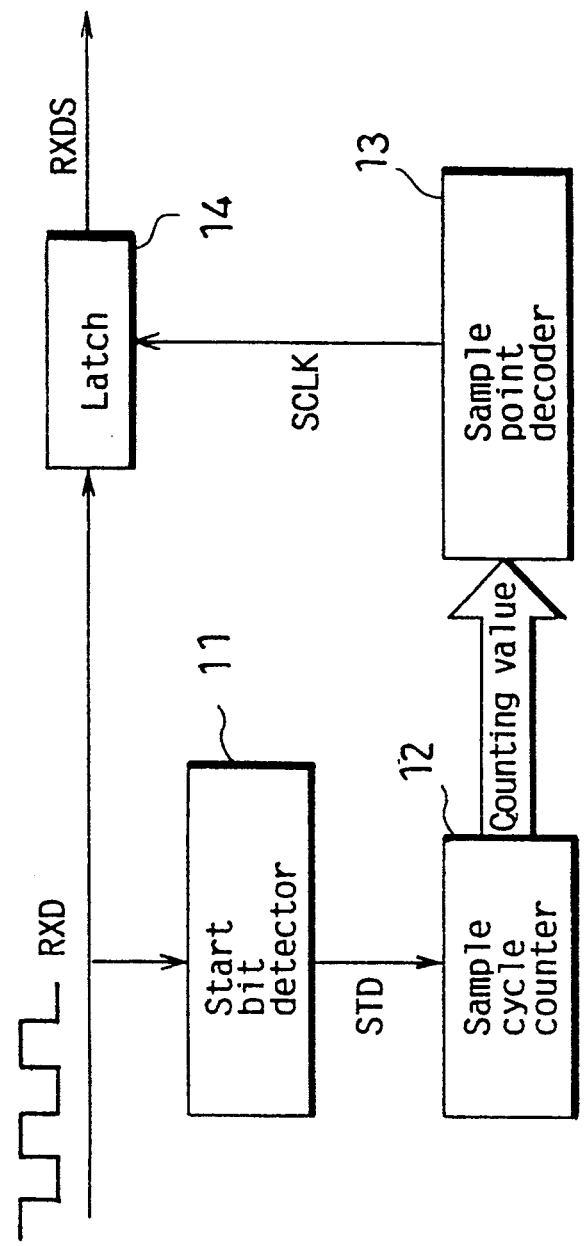
FIG. 1 is a block diagram of a conventional receiver.
Figure 2A:
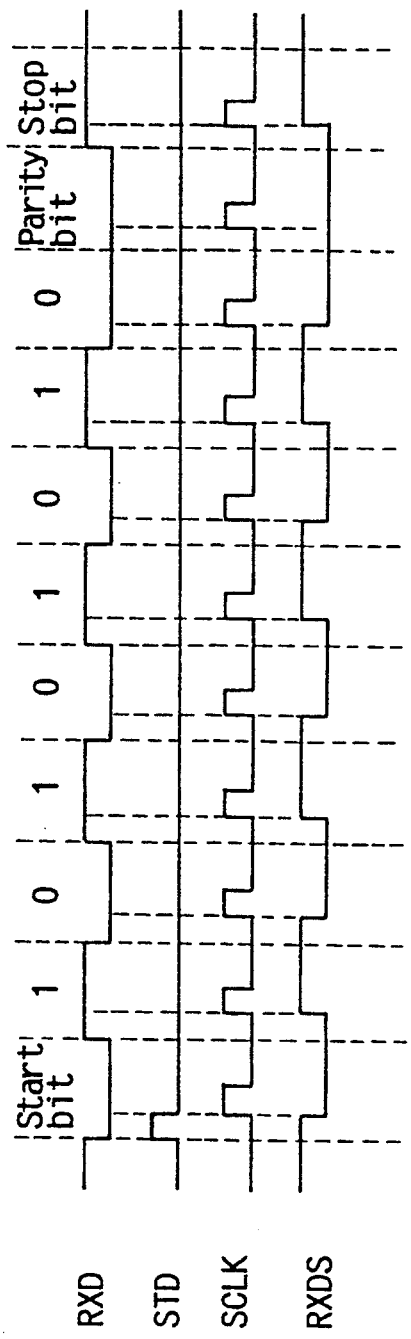
FIGS. 2a and 2b show a timing chart of the operation of the receiver in FIG. 1.
Figure 2B:
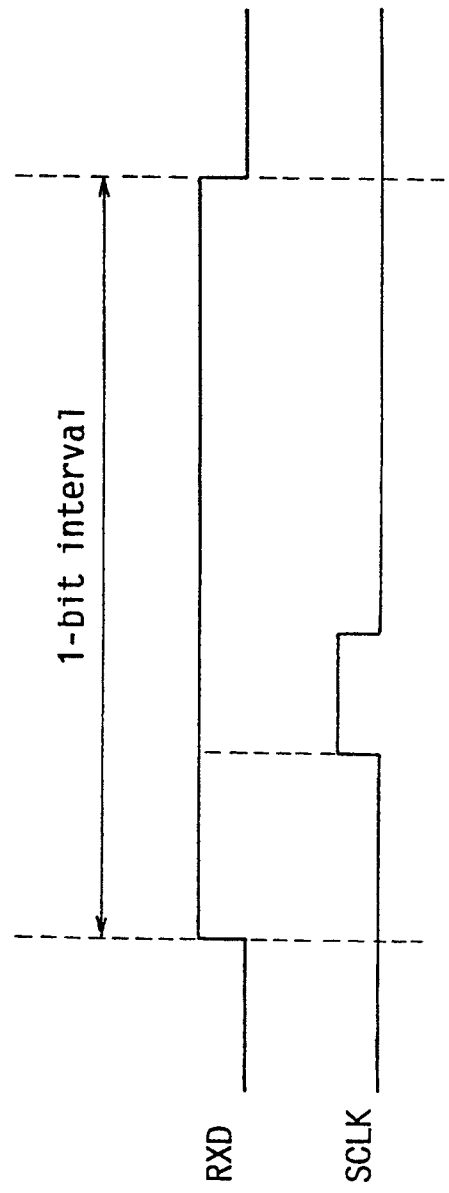
Figure 3:
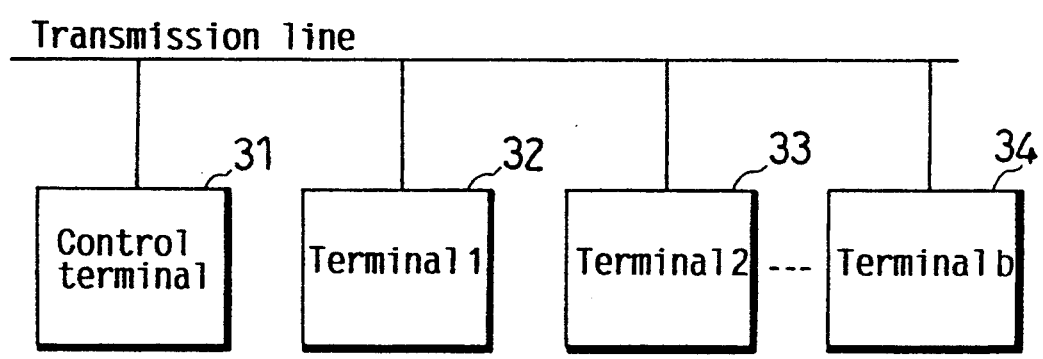
FIG. 3 is an example of a terminal control system using a conventional data transmission method.
Figure 5:
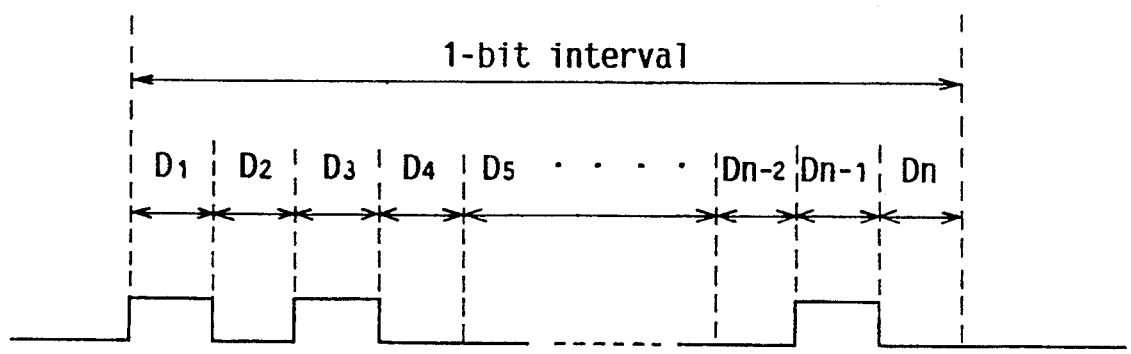
FIG. 5 is an illustration of Embodiment I of the present invention.
Figure 6:
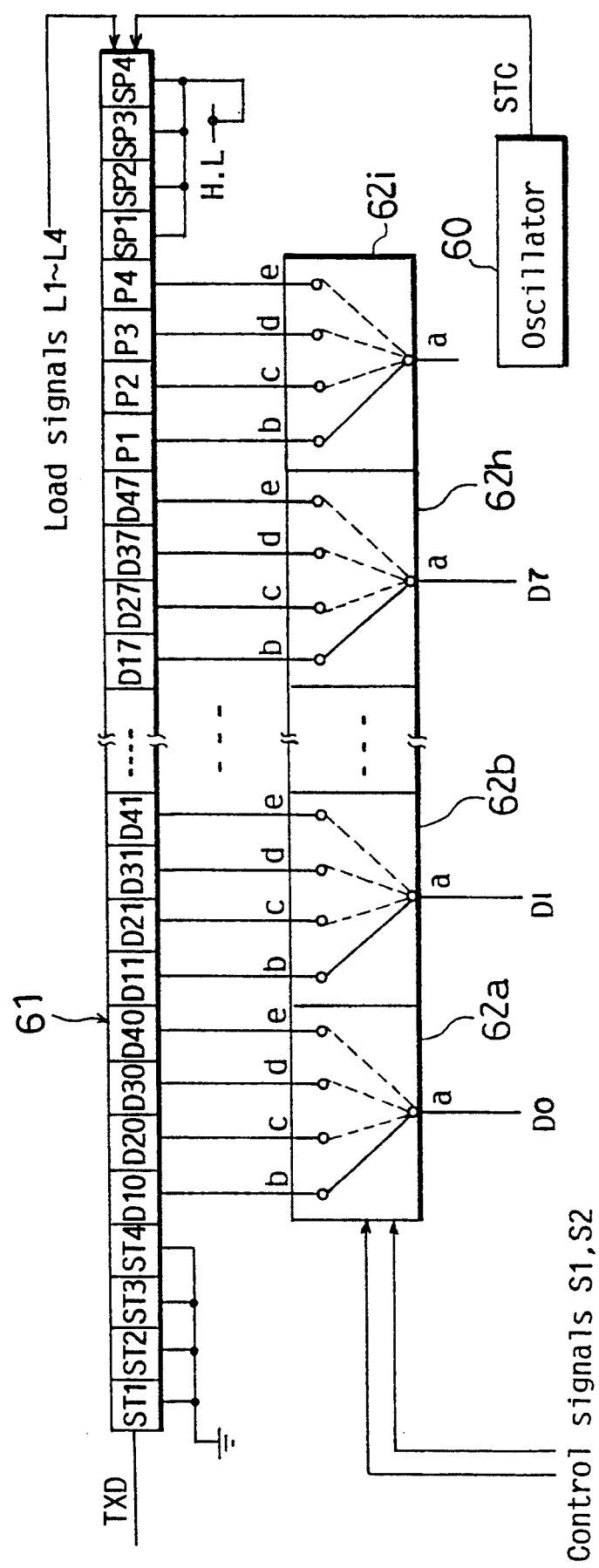
FIG. 6 is a block diagram of a transmitter applicable to the Embodiment I.
Figure 7:
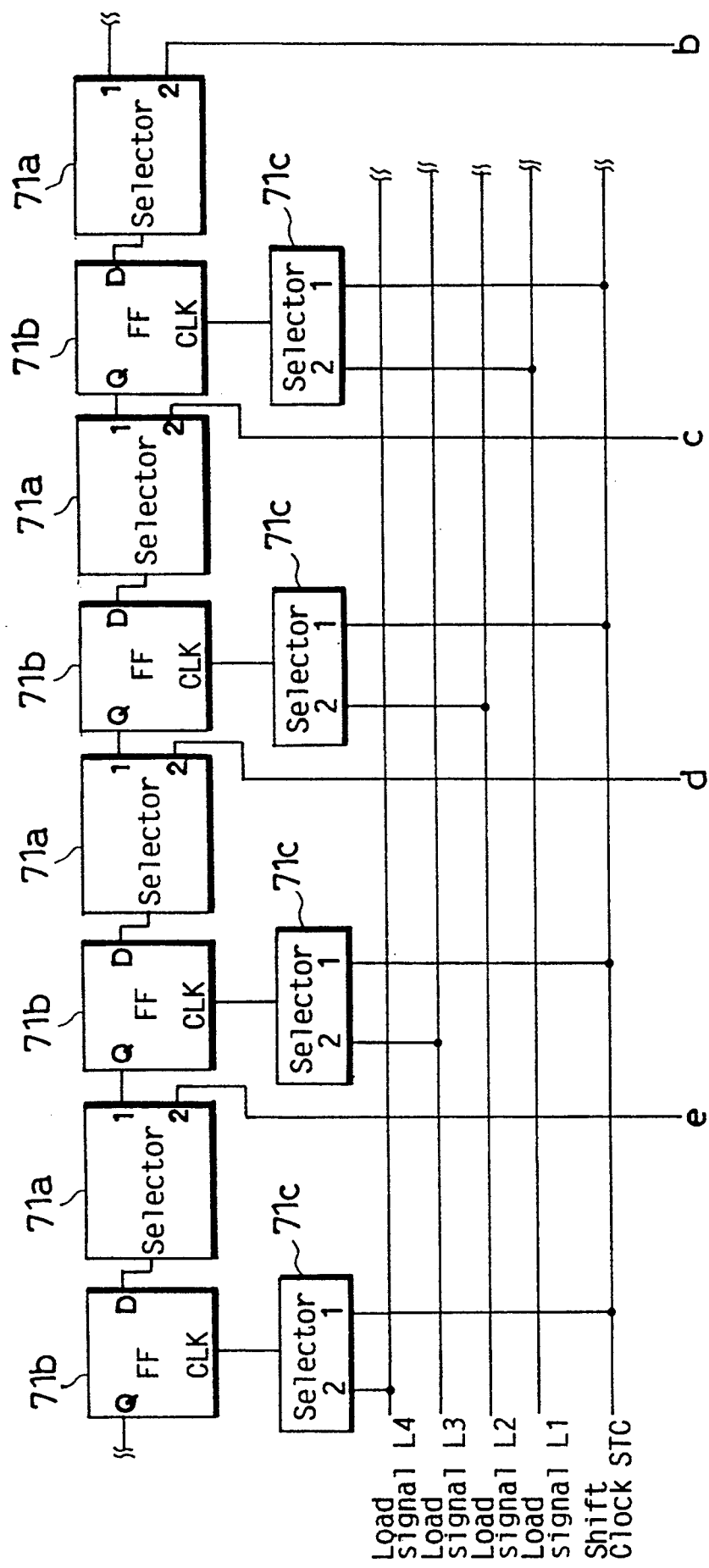
FIG. 7 is a block diagram of four latch circuits of a shift register incorporated in the Embodiment I.

A transmitter that transmits data multiplexed with (n) of 8-bit data is shown in FIG. 6. The construction of the multiplexed data in a conventional 1-bit interval is shown in FIG. 5, wherein the 1-bit interval is divided into (n) slots to set (n) different data thereto, respectively. For the simplification, the 1-bit interval is divided into 4 slots in the embodiment. The transmitter comprises a shift register 61 and 9 demultiplexes 62a–62i. The shift register 61 includes 44 latch circuits, and the construction of the 4 latch circuits, each having selectors 71a and 71c with 2-input and 1-output, and a flip-flop 71b, is shown in FIG. 7. The demultiplexes 62a–62h are provided for the first to eighth bits in the data and the demultiplexer 62i is for the parity bit, each of which is equipped with 1-input and 4-outputs. An oscillator 60 outputs a shift clock signal STC (hereinafter, referred to as the STC) with a frequency which is 4 times as high as that of the transmission data.

The shift register 61 loads the data, or the load data, inputted through input terminals thereof at timings of load signals L1–L4, while it outputs serial transmission data TXD (hereinafter, referred to as the TXD) by shifting the load data loaded therein one at the input of the STC. The load data inputted to each input terminal (b) are sent to each input terminal of the flip-flop 71b through the inputs 2 of each selector 71a, and subsequently each flip-flop 71b latches the data at the input of a rising edge of the load signal L1 to a clock terminal thereof through the input 2 of the selector 71c. Each flip-flop 71b latches the load data inputted to input terminals (c)–(e) with the load signals L2–L4, respectively.

More precisely, the latch circuits ST1, D10–D17, P1 and SP1 load the load data inputted through the input terminal (b) at the input of the load signal L1, while the latch circuits ST2, D21–D27, P2 and SP2 load the load data inputted through the input terminal (c) by the load signal L2 and so forth. Each flip-flop 71b outputs the load data to the input terminal of the flip-flop 71b installed in the left thereof through the selector 71a therebetween. Each flip-flop 71b latches the data at the rising edge of the STC into the clock terminal of the flip-flop 71b through the terminal 1 of the selector 71c. As a result, the load data are shifted to the left by 1-bit at each rising edge of the STC.

Thus, the load data inputted to an input terminal (a) of each demultiplexes 62a–62i are outputted from one of the output terminals (b)–(e) thereof in accordance with control signals S1 and S2 from an illustrated control unit. More precisely, when the control signals S1 and S2 are 00, 01, 10, and 11, the data are outputted from the output terminals (b), (c), (d), and (e), respectively.

The above transmitter constructed as above operates in the following way.

Upon receiving the control signal 00, each input terminal (a) and output terminal (b) in the demultiplexes 62a–62i are connected electrically. Then, each signal D0–D7 and a parity bit P1 of the first data are inputted to the respective 9 load terminals of the shift register 61 through the input terminal (a). Upon receiving the load signal L1, the shift register 61 loads the signals D0–D7 and parity bit P1 in latch circuits D10–D17, and P1, respectively while at the same time it loads the start bit 0 and stop bit 1 in latch circuits St1 and Sp1, respectively. The second–fourth data and the parity bits thereof together with the start bits and stop bits are loaded in the respective 11 latch circuits of the shift register 61 in the same manner. Thus, the first to fourth data are loaded in the shift register In the mean time, the oscillator 60 outputs the STC to the shift register 61, whereupon it outputs the TXD by shifting the load data inputted therein. The input of the STC continues until the last stop bit is transmitted. While transmitting a code, or from the first start bit to the last stop bit, the first data of the succeeding transmission data are inputted to the load terminal of the shift register 61, and upon the transmission of the last stop bit, the first data of the succeeding transmission data are loaded followed by the second, third, and fourth data thereof. The shift register 61 starts the transmission of the succeeding data when the loading thereof is completed. Thus, a number of data are transmitted by repeating the loading and transmitting consecutively.

Since the volume of the first to fourth data are necessarily the same, it should be noted that the first, second, third, and fourth slots come in this order in the data volume so as to set the stop bit in the slot having the least volume.

The above construction makes it possible to transmit the 4 data per bit in the multiplex data while only 1 data are transmitted with the conventional construction, therefore, enhancing the transmission efficiency, and further, making it unnecessary to provide another transmission line.

Figure 8:
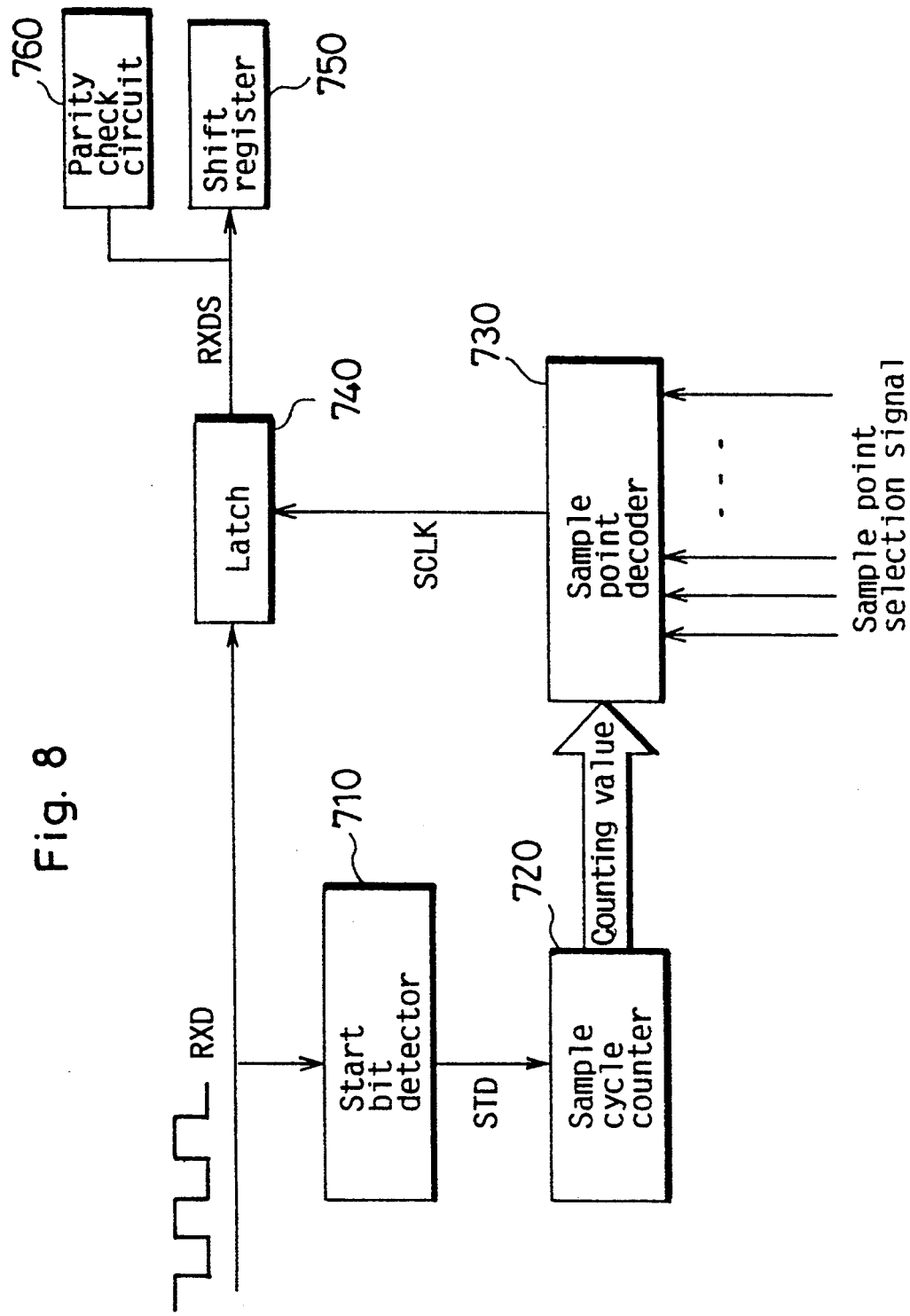
FIG. 8 is a block diagram of a receiver applicable to the embodiment.

A receiver that receives multiplex data with 2 of 8-bit data is shown in FIG. 8.

Figure 9:
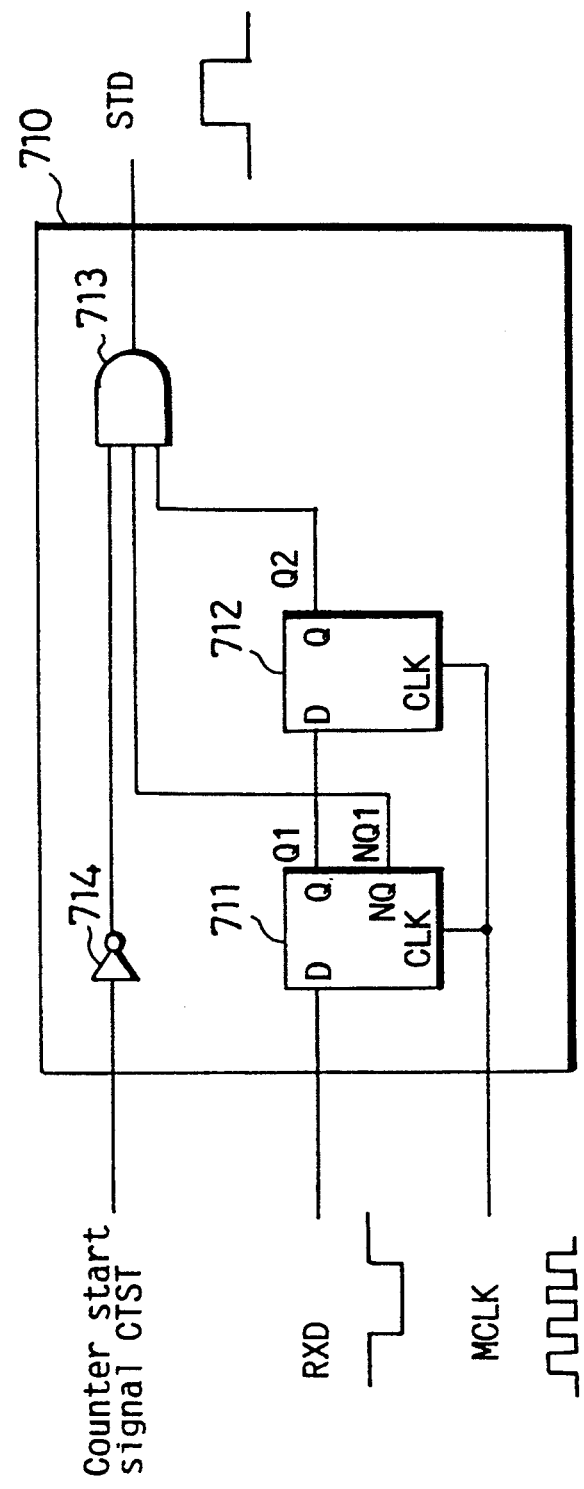
FIG. 9 is a block diagram of the start bit detecting device in FIG. 8.
Figure 10:
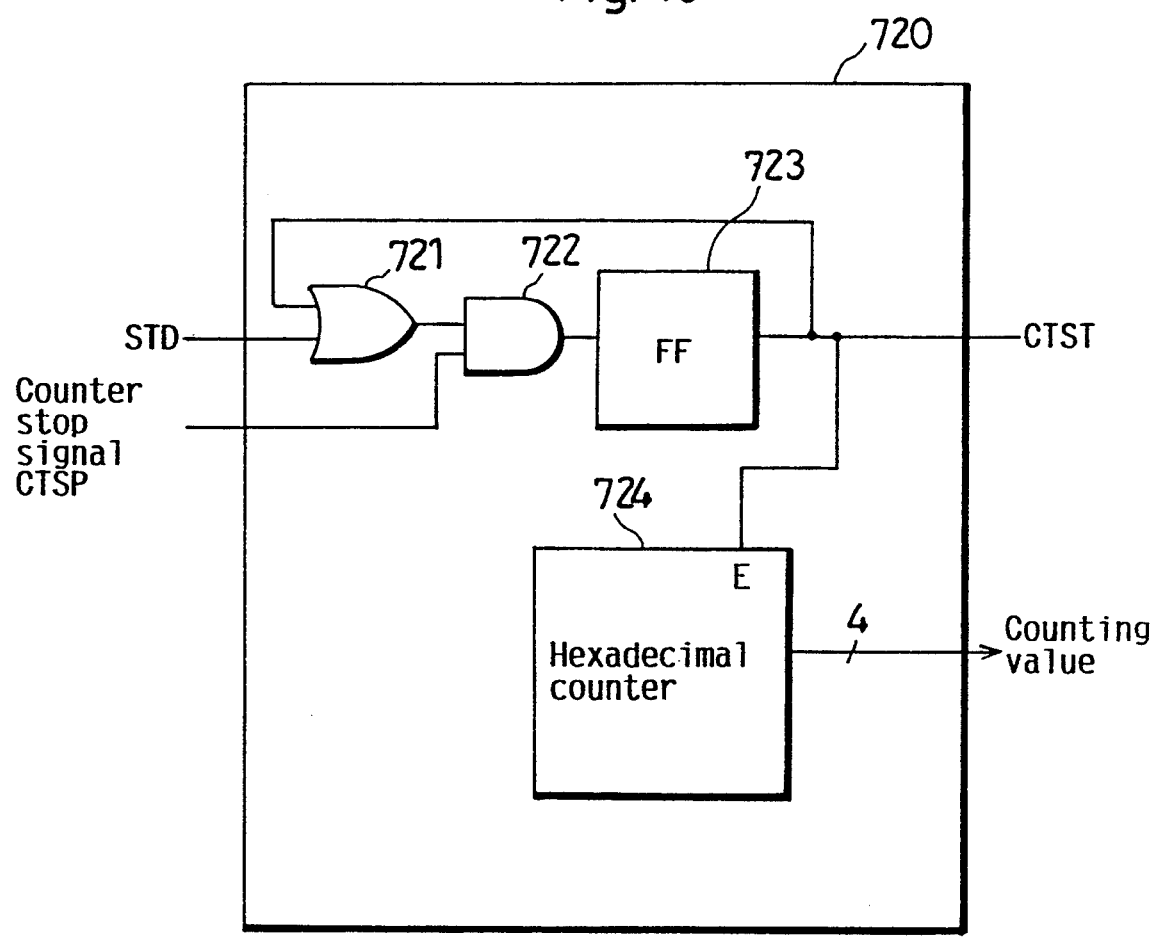
FIG. 10 is a block diagram of the sample cycle counting device in FIG. 8.
Figure 11A:
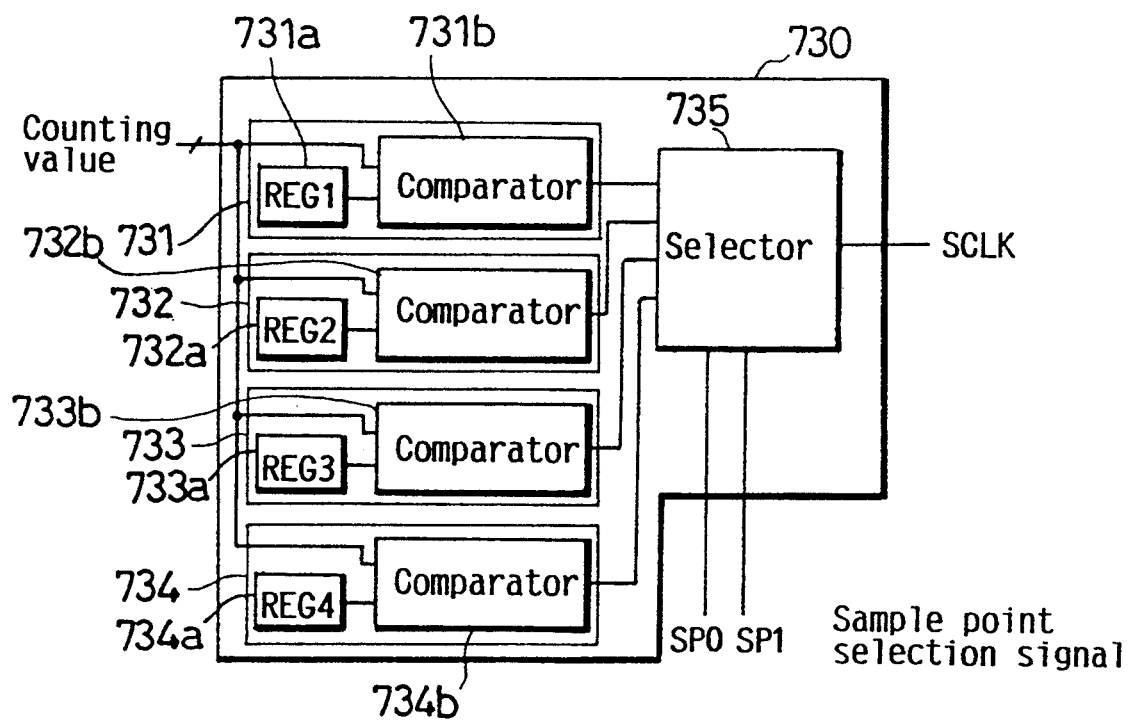
FIG. 11(a) is a block diagram of the sample point decoder in FIG. 8.

The receiver comprises a start bit detector 710, a sample cycle counter 720, a sample point decoder 730, and a latch 740. The start bit detector 710 includes a flip-flop circuit 711, a flip-flop circuit 712, an AND circuit 713, and a NOT circuit 714 in order to detect a falling edge of a start bit as shown in FIG. 9. The sample cycle counter 720 includes an OR circuit 721, an AND circuit 722, a flip-flop circuit 723, and a hexadecimal counter 724 as shown in FIG. 10. The frequencies of signals inputted to the flip-flop circuit 723 and hexadecimal counter 724 are 16 times as high as that of the 1-bit interval. The sample point decoder 730 includes the first to fourth counting value detectors 731-734 and a selector 735, and each of the first to fourth counting value detectors 731-734 includes 4-bit register 731a-734a and 4-bit comparators 731b-734b, respectively as shown in FIG. 11(a).

Upon detecting the falling edge of the start bit of the RXD, the start bit detector 710 outputs a start bit detection signal as the STD to the sample cycle counter 720. Although an output terminal of the AND circuit 713 outputs a low-level signal, it is turned into a high-level signal, or the STD, when the flip-flop 711 latches the falling edge of the first start bit and an output terminal Q2 of the flip-flop 712 outputs a high-level signal. The STD is turned into the low-level signal (0) when a counter start signal CTST (hereinafter, referred to as the CTST) is activated and outputs a low-level signal to the AND circuit 713 through the NOT circuit 714.

Upon receiving the STD, the sample cycle counter 720 counts a number obtained by multiplying the number of the slots within the 1-bit interval and an integer together. More precisely, the STD is sent to the flip-flop circuit 723 through the OR circuit 721 and AND circuit 722, whereupon the flip-flop circuit 723 latches the STD and outputs it as the CTST to an enable terminal of the hexadecimal counter 724. The CTST maintains the high-level (1) until the AND circuit 722 receives a counter stop CTSP (hereinafter, referred to as the CTSP) with a low level (0). Upon receiving the CTST, the hexadecimal counter 724 starts and repeats the counting in hexadecimal as long as it receives the CTST, thereby outputting 4-bit counting values consecutively.

The sample point decoder 730 outputs the SCLK when it counts a preassigned value. More precisely, the comparators 731b-734b output a matching signal when the preassigned value in the register and the counting value from the sample cycle counter 720 matches, while the registers 731a-734a store the counting values in the 1-bit interval corresponding to the timings of the SCLK of the respective slots which are outputted from the selector 735. For instance, when the 1-bit interval is divided into 4 slots, the registers 731a, 732a, 733a, and 734a store the counting values corresponding to the first, second, third, and fourth slots, respectively.

The selector 735 outputs the SCLK by selecting one of the outputs from the comparators 731b-734b in accordance with sample point selection signals SP0 and SP1.

Figure 12:
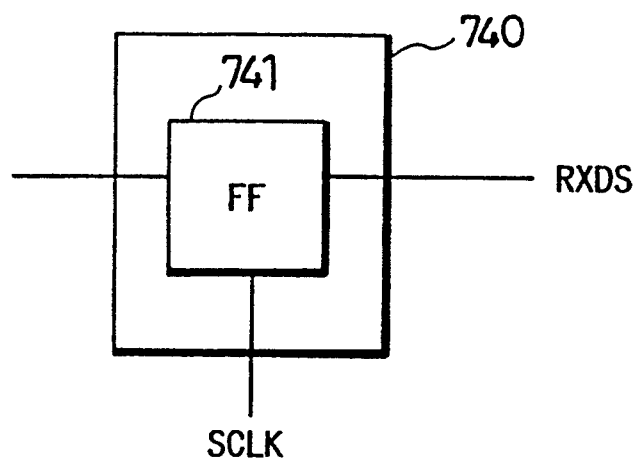
FIG. 12 is a block diagram of the latch in FIG. 8.

The latch 740 including a flip-flop circuit 741 as shown in FIG. 12 outputs the RXDS by sampling the RXD at the timing of the SCLK, while the parity check circuit 760 (FIG. 8) checks the parity of the RXDS. The shift register 750 (FIG. 8) converts the RXDS into the 8-bit parallel data and outputs the CTSP upon receiving the stop bit.

Although the counting values are stored in the registers 731a-734a, they may be fixed electrically by using such as terminals with DIP switches.

Followings are the operation of the receiver constructed as above.

Figure 13:
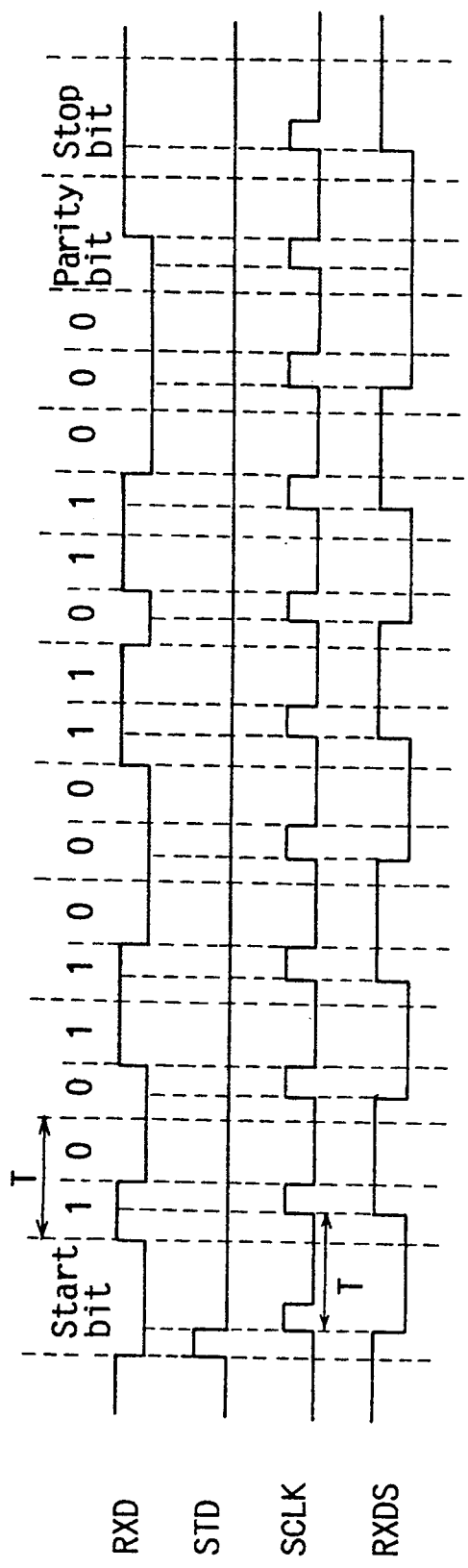
FIG. 13 is a timing chart of the operation of the receiver in FIG. 8.

The timing of the signals in the receiver is shown in FIG. 13. To simplify the explanation, the 1-bit interval of data is divided into 2 slots, and 2 data consisting of 8-bit, "10101010" and "01001100", are multiplexed in the data. In this case, two of the counting value detectors 731-734 are used in the operation.

Upon detecting the falling edge of the start bit of the RXD, the start bit detector 710 outputs the STD to the sample cycle counter 720. Then the flip-flop circuit 723 holds the STD and the hexadecimal counter 724 starts the operation, thereby outputting the counting values to the sample point decoder 730 consecutively.

Upon receiving the counting values, the first to fourth counting value detectors 731-734 detect the counting values corresponding to the timings of the SCLK of the respective slots and the selector 735 selects one of them in accordance with the selection signals SP0 and SP1, thereby enabling the sample point decoder 730 which outputs the SCLK in every 1-bit interval to the latch 740.

Consequently, the latch 740 outputs the RXDS by sampling the RXD consisting of "10101010" and "01001100" at the rising edge of the SCLK, and the shift register 750 converts the RXDS into the 8-bit parallel data "10101010", while the parity check circuit 760 checks the parity thereof.

With the receiver constructed as described above, the sample timing, i.e. the rising edge of the SCLK, can be set arbitrarily in accordance with data set in a selected slot, therefore enabling another receiver to receive "01001100" simultaneously. Furthermore, the number of the data to be multiplexed can be selected arbitrarily as well.

Figure 14:
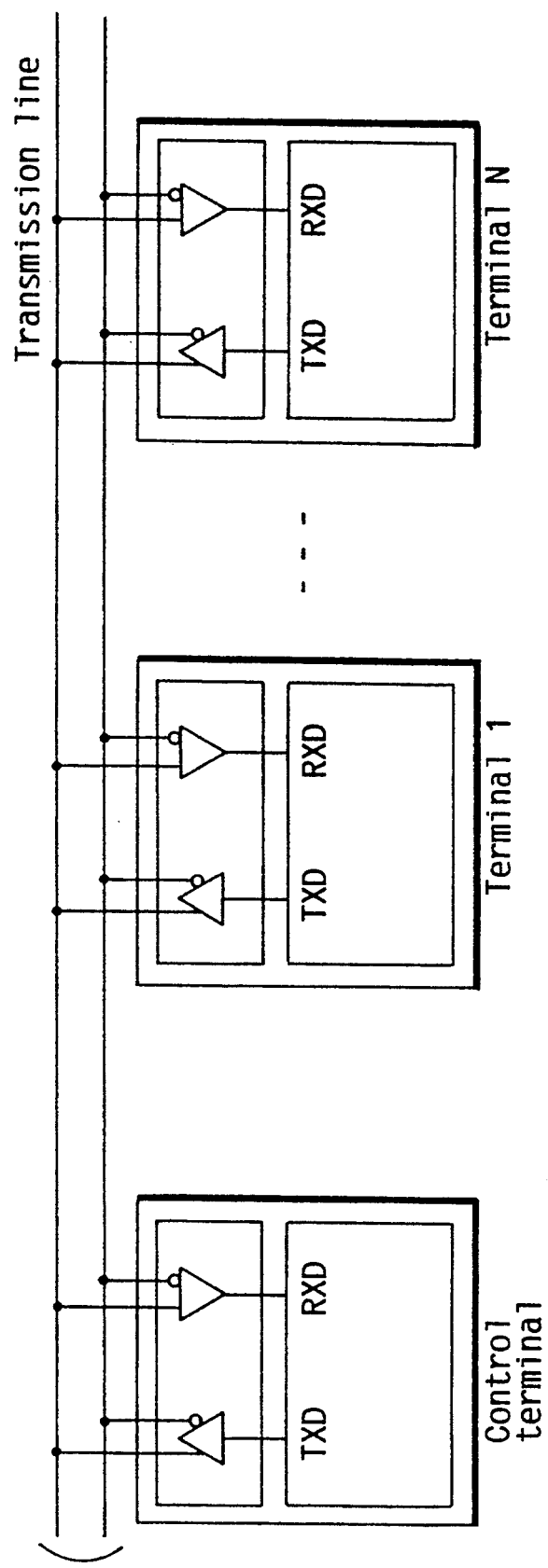
FIG. 14 is an illustration of a terminal control system using the data transmission method of the Embodiment I.

An example of the system using the above multiplex data transmission method with the transmitter and receiver is described with referring to FIG. 14.

In the system, a control terminal and terminals 1-N are connected to one transmission line. The control terminal and each terminal include a communication unit, a line receiver, a line driver for outputting a tristate. The control terminal is equipped with the transmitter and each of the terminals 1-N is equipped with the receiver. All the terminals are under the control of the control terminal with commands transmitted through the transmission line.

Figure 15:
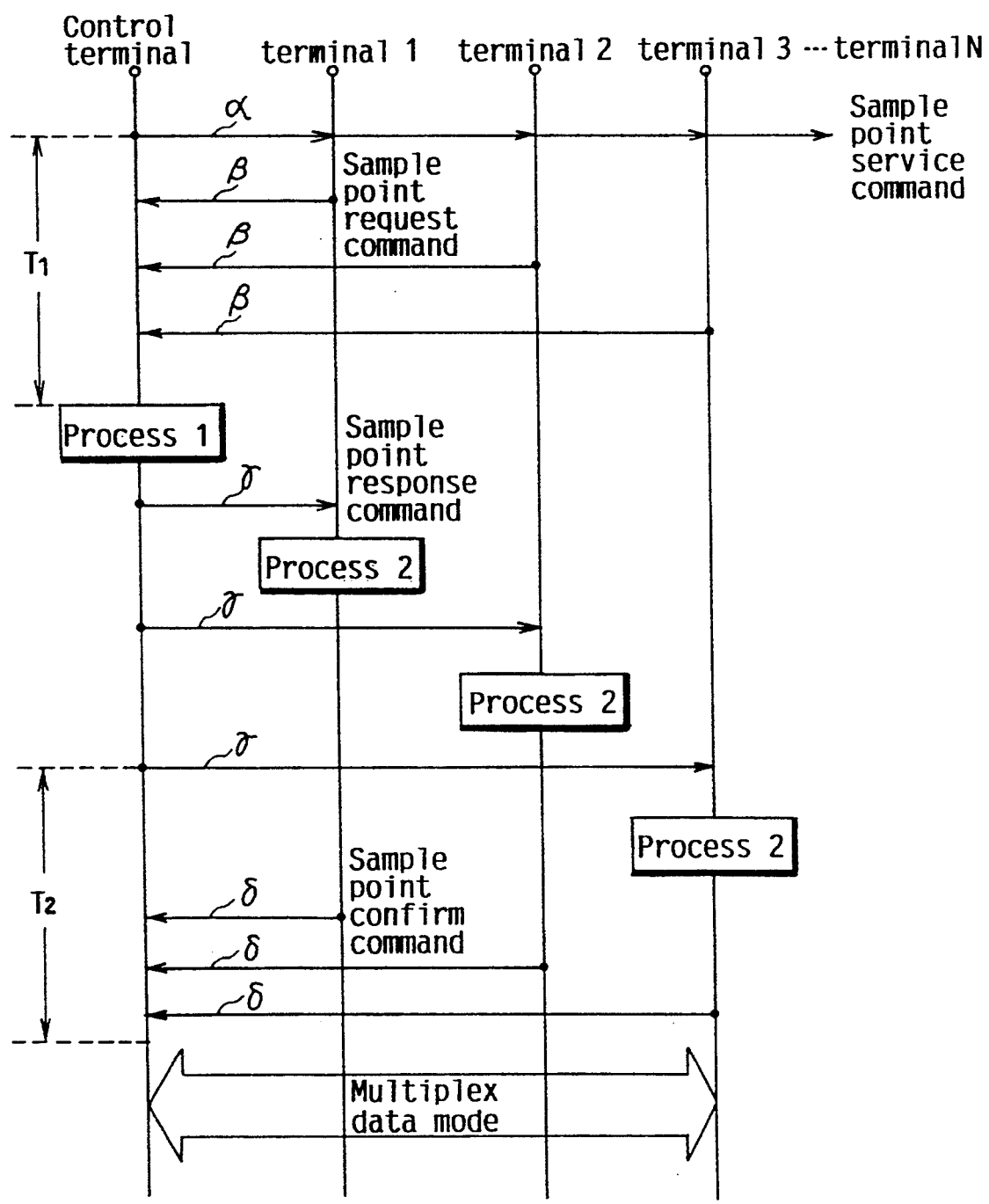
FIG. 15 is a terminal control sequence of the system in FIG. 14.

Prior to the transmission of the multiplex data, the transmission sequence as shown in FIG. 15 allocates the slots of the multiplex data to each of the terminals 1-N using non-multiplex data: a sample point service command $\alpha$, a sample point request command $\beta$, a sample point response command $\gamma$, and a sample point confirm command $\delta$. Although the sample service command $\alpha$ can be transmitted through either the separate or broadcast communication, the latter is applied in the embodiment.

The sample service command $\alpha$ is transmitted to each of the terminals 1-N asking its capability of receiving the multiplex data transmission, upon which each terminal returns the sample point request command $\beta$ having set a desirable sample point therein to the control terminal.

The control terminal accepts the sample point request command $\beta$ for a lapse of given time T1, and subsequently proceeds a sample point discrimination processing (Process 1), through which capability of the multiplex data transmission of each terminal is discriminated. Then, the control terminal transmits the sample point response command $\gamma$ informing the discrimination result to all the terminals 1-N. Upon receiving the sample point response command $\gamma$, each terminal proceeds a sample point setting process (Process 2), through which a sample timing for each terminal in the sample point response command γ is set thereto, and subsequently each terminal returns the sample point confirm command 6 informing the completion of the sample point setting .

The control terminal accepts the sample point confirm command α for a lapse of a Given time T2 from the transmission of the sample point response command y, and records the allocation of the slots, thus enabling the control terminal to transmit non-multiplex data as well as to switch to a multiplex mode, if necessary, so that the control terminal transmits multiplex data based on the allocation of the slots.

When the terminals in the network returns the sample point request command β after the slots were allocated due to a different start-up, the control terminal reallocates the slot confirming the previous allocation in order to prevent the double allocation, and follows the sequence afterwards.

Such an operation system makes it possible to prevent the terminals from receiving messages not addressed to them. In addition, having set the sample point for each terminal enables the control terminal to control a number of terminals only by transmitting the multiplex data simultaneously to all the terminals.

(EMBODIMENT II)

Figure 11B:
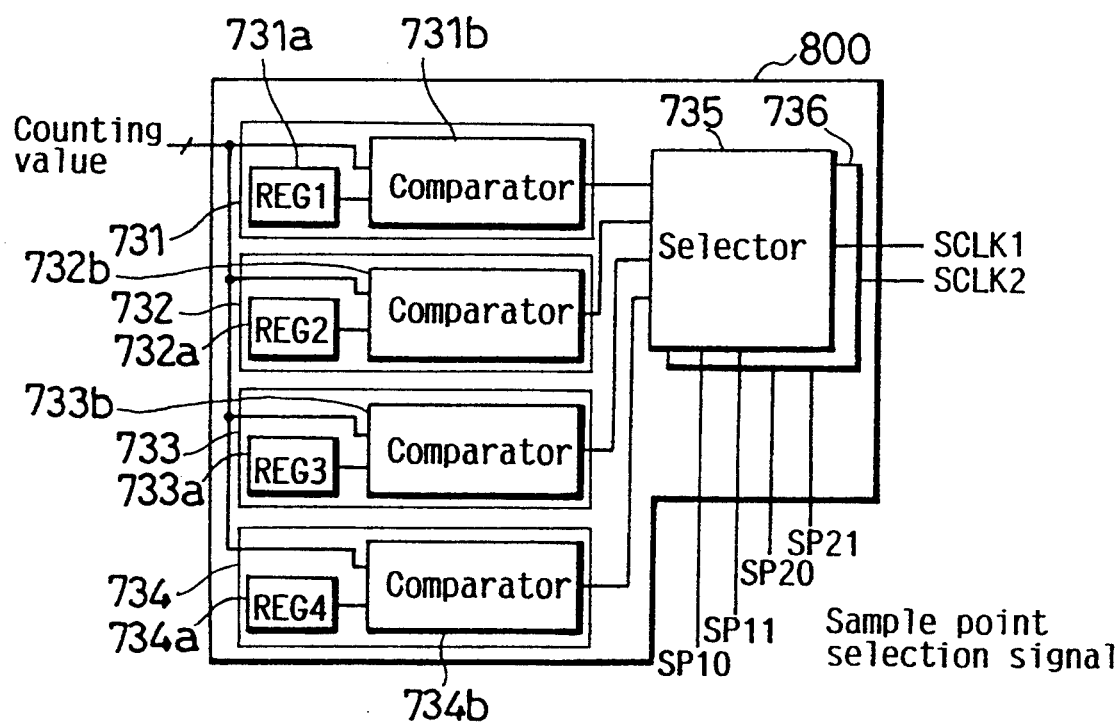
FIG. 11(b) is a block diagram of the sample point decoder in FIG. 16.
Figure 16:
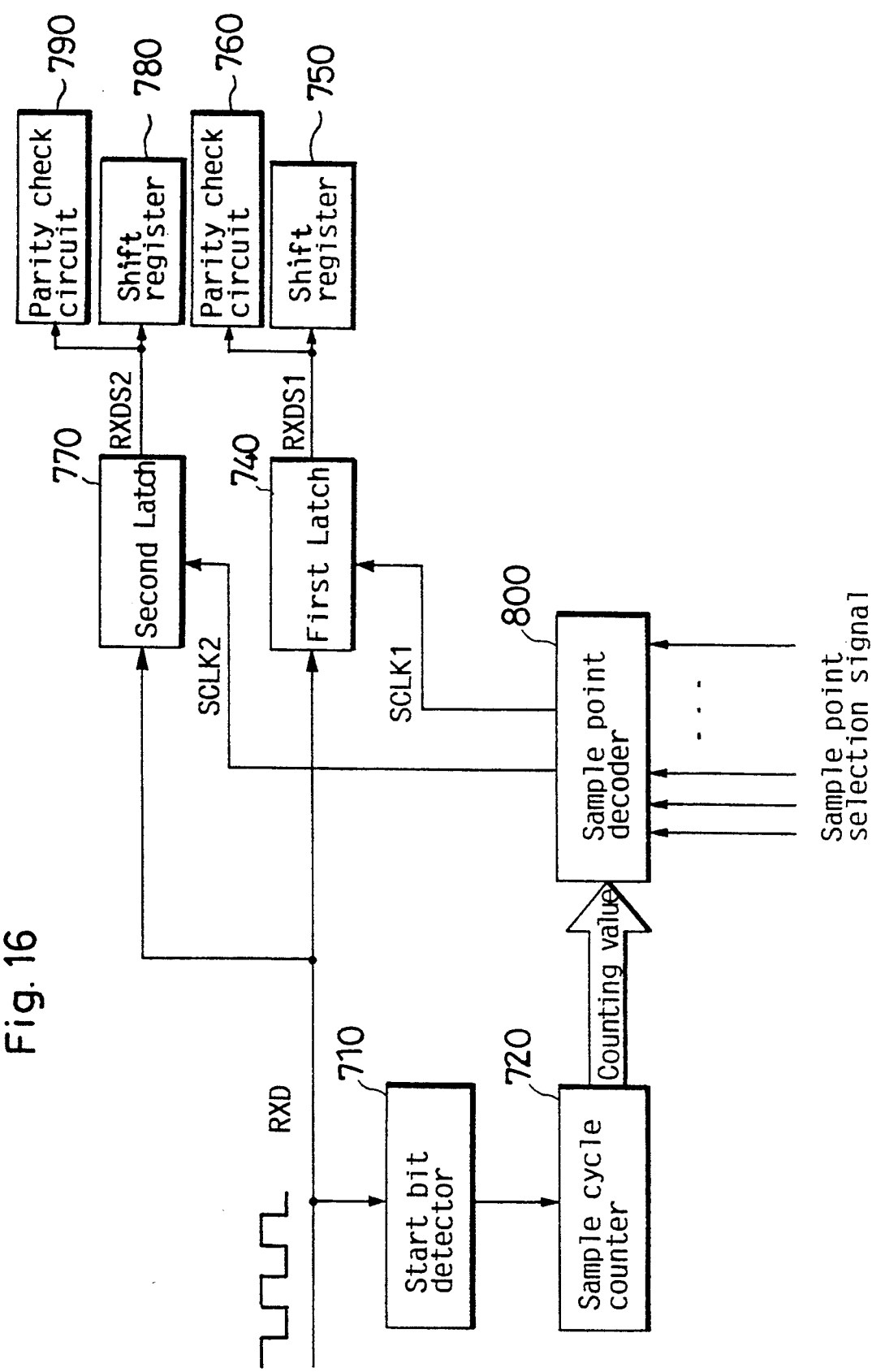
FIG. 16 is a block diagram of a receiver of Embodiment II.

Another receiver of the present invention is described with referring to FIG. 16. The receiver has the same construction as the Embodiment I except that a second selector 736, a second latch 770, a second shift register 780, and a second parity check circuit 790 are added and that a sample point decoder 800 is installed instead of the sample point decoder 730, the construction of which is shown in FIG. 11(b). Hereinafter, like components are labeled with like reference numerals with respect to the Embodiment I and the description of these components is not repeated.

The matching signal is outputted to the corresponding register as in the same way described in Embodiment I.

As shown in FIG. 11(b), the first selector 735 outputs sample clock signal SCLK1 (hereinafter, referred to as the SCLK1) by selecting one of the outputs from the comparator 731b–734b in accordance with the sample point selection signals SP10 and SP11, while the second selector 736 outputs sample clock signal SCLK2 (hereinafter, referred to as the SCLK2) by selecting another output from the comparator 731b–734b in accordance with the sample point selection signals SP20 and SP21.

The first latch 740 outputs serial data RXDS1 (hereinafter, referred to as the RXDS1) by sampling the serial data RXD at the timing of the SCLK1 from the sample point decoder 800. The first shift register 750 converts the RXDS1 into the 8-bit parallel data and outputs the CTSP upon receiving the stop bit, while the first parity check circuit 760 checks the parity thereof. The second latch 770 having the same construction as the first latch 740 outputs serial data RXDS2 (hereinafter, referred to as the RXDS2) by sampling the RXD at the timing of the sample clock signal SCLK2 from the sample point decoder 800. The second shift register 780 converts the RXDS2 into the 8-bit parallel data and outputs the CTSP upon receiving the stop bit while the second parity check circuit 790 checks the parity thereof.

The receiver constructed as above operates in the following way.

Figure 17:
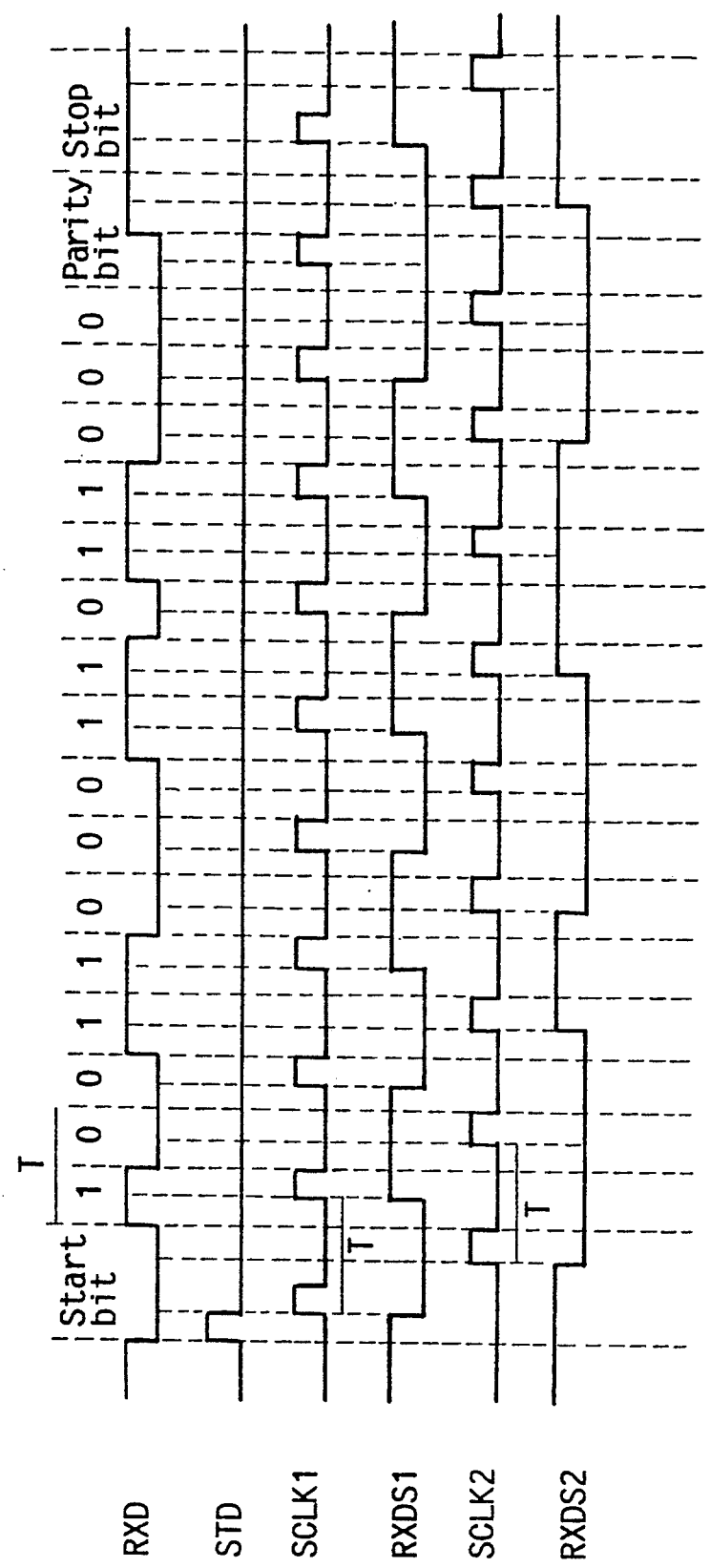
FIG. 17 is a timing chart of the operation of the receiver in FIG. 16.

The timing of the signals in the receiver is shown in FIG. 17. To simplify the explanation, the 1-bit interval is divided into 2 slots and 2 of 8-bit data, "10101010" and "01001100", are multiplied in the data, where only 2 of the counting value detectors 731–734 are used in the operation.

Upon detecting the falling edge of the start bit of the RXD, the start bit detector 710 outputs the STD to the sample cycle counter 720. Then the flip-flop circuit 723 holds the STD and the hexadecimal counter 724 starts the operation, thereby outputting the counting values to the sample point decoder 800.

Upon receiving the counting value, the first to fourth counting value detectors 731–734 detect the counting values corresponding to the timings of the SCLK of the respective slots and the first selector 735 selects one of them in accordance with the selection signals SP10 and SP11, thereby enabling the sample point decoder 800 outputs the SCLK1 in every 1-bit interval to the first latch 740. While at the same time, upon receiving the counting value, the first to fourth counting value detectors 731–734 detect the counting values corresponding to the timings of the SCLK of the respective slots and the second selector 736 selects one of them in accordance with the selection signals SP20 and SP21, thereby enabling the sample point decoder 800 outputs the SCLK2 in every 1-bit interval to the second latch 770.

The first and second latches 740 and 770 output the RXDS1 and RXDS2 by sampling the RXD consisting of "10101010" and "01001100" at detecting the rising edge of the SCLK1 and SCLK2, respectively.

Consequently, the first and second shift registers 750 and 760 convert the RXDS1 and RXDS2 into 8-bit parallel data, "10101010" and "01001100", respectively while the first and second parity check circuits 760 and 790 check the parity thereof.

Constructed as above, the receiver is able to receive the 2 data simultaneously. In addition, increasing the number of the sample clock signals and latches makes it possible to multiplex as many data as one desires in the data.

(EMBODIMENT III)

Figure 18:
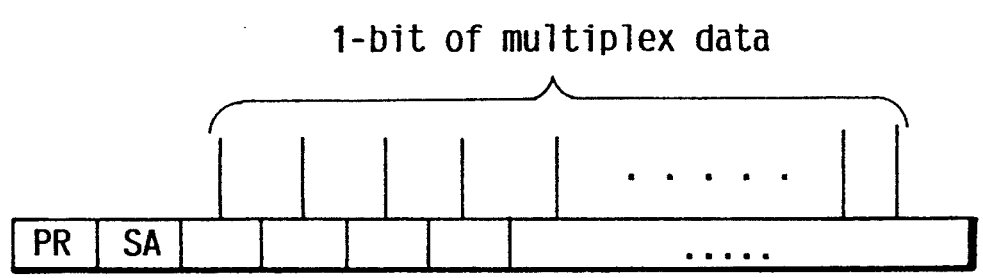
FIG. 18 is an illustration of the structure of the multiplex data used in Embodiment III.

In a transmission system shown in FIG. 14, the contention among the terminals should be detected by prior to the multiplex data transmission so as not to start to the transmission when there is contention. Therefore, the multiplex data transmitted in the Embodiment III comprises a preamble code PR for controlling contention, an address code SA representing address of the transmitter following the preamble code PR, and multiplex data following the address code SA as shown in FIG. 18. Neither the preamble code PR nor the address code SA is multiplexed. With the transmission data constructed as above, the terminals discriminate the match between the received and transmitted data every bit while they are transmitting the bits from the start bit of the preamble code PR to the last bit of the address code SA, so that they can stop the transmission when they do not discriminate the match, and continue the transmission when they do, thereby enabling the terminals to transmit the multiplex data while it control the contention among the terminals.

Figure 19:
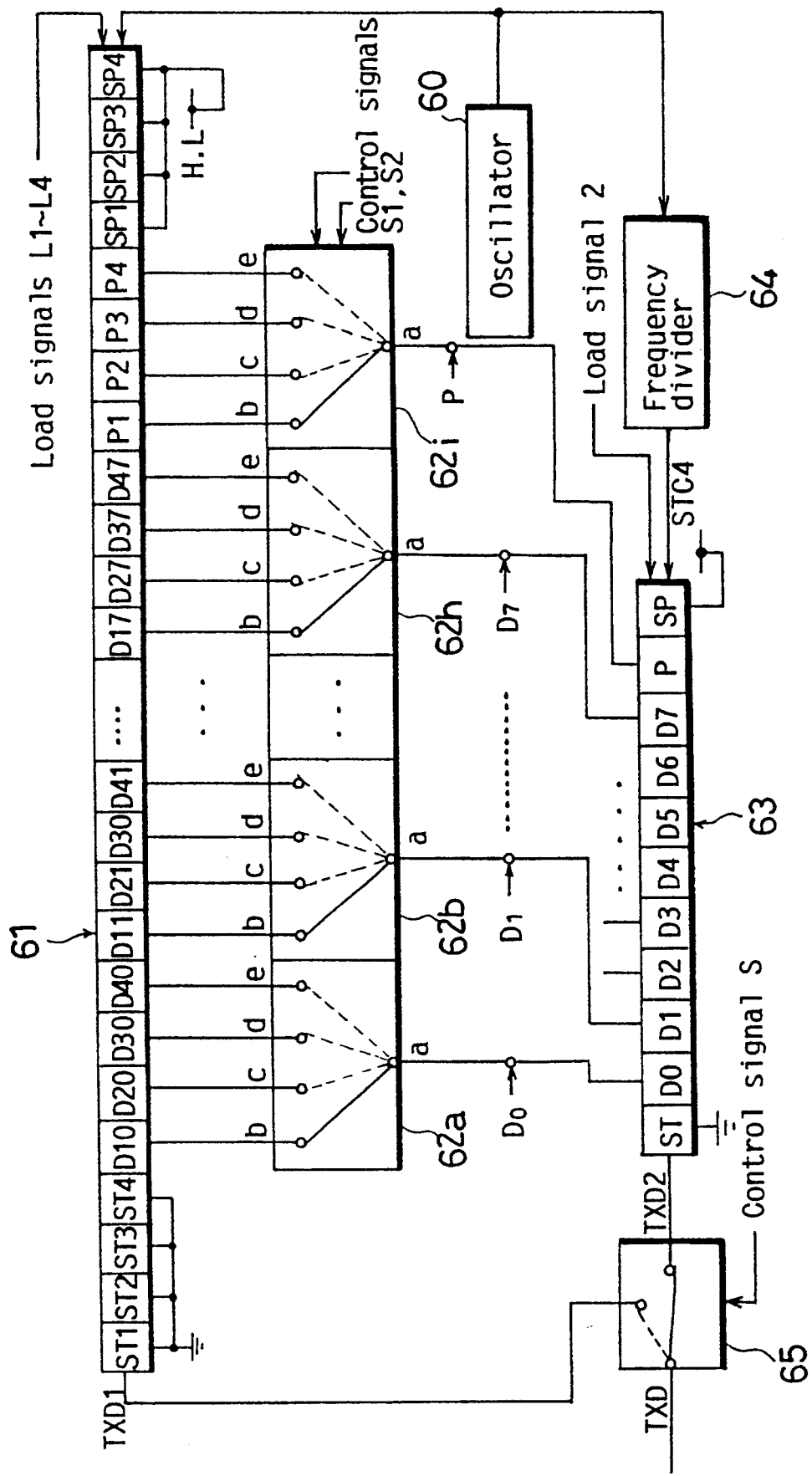
FIG. 19 is a block diagram of a transmitter applicable to the data transmission method of the Embodiment III.

Another transmitter that transmits data multiplexed with 4 of 8-bit data is shown in FIG. 19. The transmitter has the same construction as the one of Embodiment I except that a second shift register 63, a frequency divider 64, and a selector 65 are added thereto. Hereinafter, like components are labeled with like reference numerals with respect to the Embodiment I and the description of these components is not repeated. The second shift register 63 has 10 latch circuits and the frequency divider 64 outputs a shift clock signal STC4 (hereinafter referred to as the STC4) with a frequency reduced to ¼ of that of the STC inputted thereto. The selector 65 selects one of the transmission data from the first and second shift registers 61 and 63.

The transmitter constructed as above operates in the following way.

The selector 65 selects the second shift register 63 based on a control signal S in order to transmit the preamble code PR and address code SA, upon which the preamble code PR inputted to the input terminal of the second shift register 63 is loaded thereto at the input of a load signal L. Upon receiving the STC4, the second shift register 63 outputs the preamble code PR as transmission data TXD2 (hereinafter, referred to as the TXD2) by shifting the one loaded therein. The TXD2 are transmitted as the TXD through the selector 65.

During the transmission of the preamble code PR, the address code SA is inputted to the load terminal of the second shift register 63, and loaded thereto upon the transmission of the stop bit of the preamble code PR at the input of the load signal L. In turn, at the timing of the STC4, the second register 63 outputs the address code SA as the TXD by shifting the one loaded therein through the selector 65.

During the transmission of the address code SA, the 4 data are set in the first shift register 61. Upon receiving the control signal 00, each input terminal (a) and output terminal (b) connect the demultiplexers 62a-62i electrically. Subsequently, each signal D0-D7 and the parity bit P1 of the first data are inputted to the respective 9 load terminals of the shift register 61 through the input terminals (a). Upon receiving the load signal L1, the shift register 61 loads the signals D0-D7 and parity bit P1 in the latch circuits D10-D17, and P1, respectively. While at the same time it load the start bit 0 and stop bit 1 in the latch circuits St1 and Sp1, respectively. The second–fourth data and the parity bits thereof together with the start bits and stop bits are loaded in the respective 11 latch circuits in the same manner. As a result, the first to fourth data of 11-bit consisting of the start bit, 8-bit data, parity bit, and a stop bit are loaded in the shift register 61.

Upon the transmission of the TXD, the selector 65 selects the first shift register 61 in accordance with the control signal S. Upon receiving the STC from the oscillator 60, the first shift register 61 outputs the loaded first to fourth data as serial transmission data TXD1 by shifting the TXD inputted therein through the selector 65. While transmitting a code, or from the first start to the last stop bit, the first data of the succeeding transmission data are inputted to the load terminal of the first shift register 61, and upon the transmission of the last stop bit, the first data of the succeeding transmission data are loaded followed by the second, third, and fourth data thereof. The first shift register 61 starts the transmission of the succeeding data when the loading thereof is completed. Thus, a number of data are transmitted by repeating the loading and transmitting consecutively.

Consequently, transmission of the preamble code PR and address code SA prior to the multiplex data transmission enables the terminals to detect the contention, thereby avoiding inconveniences caused therefrom.

Although the present invention has been fully described by way of examples with reference to the accompanying drawings, it is to be noted that various changes and modifications will be apparent to those skilled din the art. Therefore, unless otherwise such changes and modifications depart from the scope of the present invention, they should be construed as being included therein.

What is claimed is:

1. A start-stop synchronous data transmitter transmitting a code including a start bit, data, and a stop bit, the transmitter comprising:
    an oscillator for outputting a high speed shift clock signal;
    parallel-serial converting means for converting parallel signals into serial signals synchronously with the high speed shift clock signal and having (n) load signal lines and as many latch elements as a number obtained by multiplying the number of bit consisting of the code and (n) together, where (n) is an integer, with each load signal line being electrically connected to a plurality of load terminals of the latch elements at every (n)th load terminal, each latch element including a data input terminal; and
    writing means for inputting the data and for activating the load signal lines one by one in order to write the data in the latch elements displaced in every (n) latch elements.

2. A transmitter of claim 1, wherein the parallel-serial converting means includes a shift register for transmitting multiplex data having as many steps as a number obtained by multiplying the number of bits consisting of the code and (n) together, each of which has an input terminal and a load signal terminal for parallel data, and (n) load signal lines which are connected to the load signal terminal in every (n−1) lines.

3. A transmitter of claim 1, wherein the parallel-serial converting means includes:
    a transmission buffer having as many bits as a number obtained by multiplying the number of bits consisting of the code and (n) together, an input terminal to each bit, and (n) load signal lines which are connected to load terminals of the latch elements in every nth transaction buffer bit; and
    a shift register for transmitting multiplex data having as many steps as the number of the bits of the transmission buffer to latch the parallel data therefrom.

4. A transmitter of claim 2, wherein each step of the shift register for transmitting multiplex data includes a first selector, a second selector, and a flip-flop, and
    the first selector selectively outputs the data inputted from the flip-flop in a low order bit at data shifting, and the data inputted from the writing means at data loading to an input terminal of the flip-flop,
    the second selector selectively outputs a shift clock signal at the data shifting and a load signal at the data loading to a clock input terminal of the flip-flop, and
    the flip-flop latches the data inputted to the input terminal thereof in accordance with the signal inputted to the clock input terminal thereof and subsequently outputs the latched data.

5. A transmitter of claim 1, wherein the writing means includes as many demultiplexers as the number of bits consisting the data, each demultiplexer having a 1-input terminal and a n-output terminal, and n-outputs of each demultiplexer are connected to the data input terminals of the (n) latch elements in the parallel-serial converting means.

6. A transmitter of claim 5, wherein a first (n) and a last (n) latch element are not connected to the writing means, but instead receive signals with given logical levels.

7. A transmitter of claim 5, wherein at least one control signal is sent to each demultiplexer so as to connect each input terminal and one of the n-output one by one and synchronously in all the demultiplexers.

8. A transmitter of claim 2, the transmitter further comprising:
a shift register for transmitting non-multiplex data having as many steps as the number of bits of a code including of a start bit, data, and a stop bit;
a frequency divider for outputting a frequency divider clock obtained by dividing a frequency of the shift clock signal from the oscillator by (n) to the shift register in order to transmit the non-multiplex data; and
a selector for selectively outputting one of the serial data from the shift register for transmitting the multiplex data and those from the shift register for transmitting the non-multiplex data.

9. A start-stop synchronous data receiver for receiving serial data multiplexed with (n) data by dividing a 1-bit interval of data excluding a start bit and a stop bit of a code into (n) slots so as to set each of the (n) data to the respective slots, where (n) is an integer, the receiver comprising:
start bit detecting means for detecting a first level change of the serial data and outputting a start bit detection signal;
sampling clock signal generating means for generating at least one sampling clock signal to sample the serial data at the timing of an assigned slot upon receiving the start bit detection signal; and
slot data sampling means for sampling the data belonging to the assigned slot in the serial data using the sampling clock signal.

10. A receiver of claim 9, wherein the sampling clock signal generating means includes:
an oscillator for outputting a frequency clock signal with a frequency obtained by multiplying the number of slots of (n) and a constant (m) together, where (m) is an integer.

11. A receiver of claim 10, wherein the given value for the counting means is (n)×(m), and the given value for the counting value detecting means is a number within a range of (L−1)×m+1 from (L)×(m), where (L) is a number representing a place given to the slot.

12. A receiver of claim 11, wherein the sampling clock signal generating means includes at least another counting value detecting means for detecting a given counting value for each slot and outputs a counting value detection signal as a sampling clock signal,
the receiver further comprises at least one selector for selecting one of the counting value detecting signals from a number of the counting value detecting means, and
each counting value detecting means detects the respective counting value to each slot.

13. A receiver of claim 9, wherein the slot data sampling means includes:
latch circuits for latching the serial data at the timing of the sampling clock signal; and
serial-parallel converting means for inputting and shifting the data from the latch circuits at the timing of the sampling clock signal.

14. A receiver of claim 9, wherein the slot data sampling means includes serial-parallel converting means for inputting and shifting the serial data at the timing of the sampling clock signal.

15. A receiver of claim 12, wherein the receiver includes first and second slot data sampling means and the second sampling means samples and selects the data set in a slot other than the one selected by the first slot data sampling means using another sampling clock signal which is outputted from the sampling clock signal generating means.

16. A start-stop synchronous data transmitter for receiving input data words, each input data word having a predetermined number of bits received in parallel, and for serially outputting a code in synchronization with a high speed shift clock signal, the code including a start bit, (n) output data comprised of the received input data words, and a stop bit, where (n) is an integer, the data transmitter comprising:
a plurality of demultiplexers receiving a plurality of control signals, each demultiplexer including an input load terminal and at least (n) output lines, the input load terminals respectively receiving bits of an input data word, each demultiplexer outputting a bit received thereby onto one of the demultiplexer's (n) output lines depending upon the control signals, with the plurality of demultiplexers outputting their respectively received bits at every (n)th output line; and
a parallel-to-serial converter receiving a plurality of load signals and a high speed shift clock signal, the parallel-to-serial converter including a plurality of latches electrically connected to the (n) output lines, the plurality of latches comprised of at least as many latches as a product of the integer (n) and the predetermined number of bits of the input data words, the parallel-to-serial converter loading the bits of the input data words into the latches to create the code depending upon the load signals, the parallel-to-serial converter serially outputting the code in synchronization with the high speed shift clock signal.

17. A start-stop synchronous data receiver for serially receiving a code, an interval of the code including a start bit, (n) data words, and a stop bit, where (n) is an integer, and for respectively assigning the (n) data words to a plurality of slots, the data receiver comprising:
start bit detector receiving the code and generating a start bit detection signal when a start bit of the code is detected for each interval;
sampling clock signal generator receiving a plurality of sample point selection signals corresponding to the (n) data words, the sampling clock signal generator generating at least one sampling clock signal depending upon tile start bit detection signal and the plurality of sample point selection signals; and
at least one latch sampling the code in response to the at least one sampling clock signal for respectively assigning the (n) data words to a plurality of slots.

* * * * *